(12) United States Patent
Ma et al.

(10) Patent No.: US 7,687,095 B2
(45) Date of Patent: Mar. 30, 2010

(54) HIGH MOISTURE, LOW FAT CREAM CHEESE WITH MAINTAINED PRODUCT QUALITY AND METHOD FOR MAKING SAME

(75) Inventors: Yinqing Ma, Arlington Heights, IL (US); Ted R. Lindstrom, Punta Gorda, FL (US); Isabelle Laye, Wheeling, IL (US); Ana P. Rodriguez, Evanston, IL (US); Gavin M. Schmidt, Chicago, IL (US); Mary C. Doyle, Chicago, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 1216 days.

(21) Appl. No.: 11/241,859

(22) Filed: Sep. 30, 2005

(65) Prior Publication Data

US 2007/0077342 A1   Apr. 5, 2007

(51) Int. Cl.
  *A23C 19/00*   (2006.01)
(52) U.S. Cl. .............................. 426/582; 426/36; 426/39; 426/41
(58) Field of Classification Search .................. 426/34, 426/36, 39, 41, 519, 520, 580, 582
  See application file for complete search history.

(56) References Cited

U.S. PATENT DOCUMENTS

| | | |
|---|---|---|
| 3,930,039 A | 12/1975 | Kuipers |
| 4,188,411 A | 2/1980 | Kuipers et al. |
| 4,265,924 A | 5/1981 | Buhler et al. |
| 4,552,774 A | 11/1985 | Gronfor |
| 4,734,287 A | 3/1988 | Singer et al. |
| 4,961,953 A | 10/1990 | Singer et al. |
| 4,985,270 A | 1/1991 | Singer et al. |
| 5,215,777 A | 6/1993 | Asher et al. |
| 5,217,741 A | 6/1993 | Kawachi et al. |
| 5,494,696 A | 2/1996 | Holst et al. |
| 5,882,705 A | 3/1999 | Sato et al. |
| 6,096,352 A | 8/2000 | Kijowski et al. |
| 6,139,900 A | 10/2000 | Foegeding et al. |
| 6,261,624 B1 | 7/2001 | Hudson et al. |
| 6,303,160 B1 | 10/2001 | Laye et al. |
| 6,406,736 B1 | 6/2002 | Han |
| 6,416,797 B1 | 7/2002 | Han et al. |
| 6,419,975 B1 | 7/2002 | Han et al. |
| 6,451,371 B1 | 9/2002 | Foegeding et al. |
| 6,558,716 B1 | 5/2003 | Kent et al. |
| 6,572,901 B2 | 6/2003 | Han et al. |
| 6,767,575 B1 | 7/2004 | Huss et al. |
| 6,793,954 B2 | 9/2004 | Schwegle et al. |
| 6,861,080 B2 | 3/2005 | Kent et al. |
| 6,916,496 B2 | 7/2005 | Koka |
| 7,150,894 B2 | 12/2006 | Cha |
| 2004/0022896 A1 | 2/2004 | Cha et al. |
| 2004/0091577 A1 | 5/2004 | Schwegle et al. |
| 2004/0151803 A1 | 8/2004 | Wolfschoon-Pombo et al. |

FOREIGN PATENT DOCUMENTS

| | | |
|---|---|---|
| EP | 0186233 B1 | 12/1985 |
| EP | 1306014 B1 | 10/2001 |
| EP | 1472931 A1 | 11/2004 |
| GB | 2063273 B | 11/1980 |
| WO | 97/35485 | 10/1997 |
| WO | WO 0018249 A1 | 10/2001 |
| WO | WO 0213620 A1 | 2/2002 |
| WO | WO 2004017742 A1 | 3/2004 |
| WO | WO 2005/002350 A1 | 1/2005 |

OTHER PUBLICATIONS

EP06121366SearchReport.

*Primary Examiner*—Leslie Wong
(74) *Attorney, Agent, or Firm*—Fitch, Even, Tabin & Flannery

(57) ABSTRACT

The present invention relates to methods for providing a high moisture low fat cream cheese product with high whey protein content that has a texture similar to normal cream cheese. More particularly, the invention provides a method of making a high moisture low fat cream cheese product with high whey protein content that has a higher yield stress and lower deformation values than other low fat cream cheeses with similar moisture, fat, and whey protein content. The present invention therefore is useful in producing low-cost and nutritious spreads with a pleasing texture and excellent spreadability.

16 Claims, 2 Drawing Sheets

HIGH MOISTURE, LOW FAT CREAM CHEESE WITH MAINTAINED PRODUCT QUALITY AND METHOD FOR MAKING SAME

FIELD OF THE INVENTION

The present invention relates to a cream cheese-like product and its method of manufacture. Particularly, an improved low fat, high moisture, high whey cream cheese product with a low casein-to-whey ratio and the like is provided. A method is provided for enhancing the texture attributes in such cream cheese products effective to provide firmness and spreadability similar to conventional high casein cream cheese. The present invention also provides a nutritious, low-cost dairy spread with pleasing mouth feel and excellent spreadability.

BACKGROUND

Natural cheese is generally made by adding a microorganism to milk that is capable of metabolizing lactose to produce lactic acid. The milk is usually set by using a coagulating agent or by developing acidity to the isoelectric point of the protein. The coagulating agent may include a curding enzyme, an acid, a suitable bacterial culture, or a composition thereof. The coagulum or curd that results generally incorporates the protein casein (which has been suitably altered by the curding process), fats (including natural butter fat) and flavorings arising during processing (especially when using a bacterial culture as the coagulating agent). The set milk is then cut to separate the resulting curd from the whey. The curd may be pressed to provide a cheese block in which curing generally takes place over a period of time under controlled conditions.

After the curd is separated from whey (e.g., using a centrifugal separator such as in U.S. Pat. No. 2,387,276), stabilizers, salt, and other ingredients may be added. Finally, the product is packaged and chilled. Many variations to this process have been introduced throughout the years (see, e.g., U.S. Pat. No. 5,656,320; U.S. Pat. No. 5,079,024; U.S. Pat. No. 5,180,604; U.S. Pat. No. 6,419,975; U.S. Pat. No. 6,406,736; U.S. Pat. No. 6,558,716; U.S. Pat. No. 6,416,797; and U.S. Pat. No. 4,597,971).

Cream cheese is a particularly soft, mild, acid-coagulated uncured cheese made from a mixture of cream and milk. Cream cheese has a smooth and butter-like body and is stored under refrigeration conditions. The texture and cream cheese body at refrigeration temperatures is such that the cream cheese can be sliced and spread. In traditional manufacturing of cream cheese, uncultured whole milk and/or skim milk and sweet cream are blended in pre-selected proportions to form a cream cheese mix. The cream cheese mix normally has a butterfat content of from about 10 to about 20 percent. After processing, the finished cream cheese has a butterfat content of from about 33 to about 35 percent by weight. The cream cheese mix is pasteurized and homogenized, after which it is cooled, usually to a temperature between 62 and 92° F., and is then inoculated with a lactic acid culture. The mix is held at the inoculation temperature until it has ripened and formed a coagulum. The coagulation process may, optionally, be aided by the addition of a small amount of rennet. The acidity of the coagulum is from about 0.6 to about 0.9 percent (calculated as percent equivalent lactic acid). After the desired acidity is obtained, the curd is separated from the whey and packaged.

At one time, casein was considered an essential protein component for making cheese products, including cream cheese. In fact, the functionality of casein and caseinates, such as sodium caseinate, have made casein one of the most widely used protein sources in a number of foods, such as cheese, cheese products, and whipped toppings. As a result, caseinates traditionally have been relatively expensive, leading to increased focus on protein alternatives. For instance, the use of vegetable proteins, such as soy protein, has become increasingly popular in making inexpensive cheese analogues.

Whereas casein and caseinates are in high demand and high in cost, whey proteins are relatively low-cost, and are often even discarded as a byproduct of the cheese making process. This underutilization of whey protein has led to increased focus on methods of manufacturing cheese products using concentrated whey protein or whey protein isolates. For instance, U.S. Pat. No. 6,419,975 discloses a method for making caseinless cream cheese-like products that use non-casein proteins such as whey protein. In addition to the aforementioned advantages of incorporating whey protein into food products, this process also has an advantage in that it does not require a coagulation or fermentation step, since the process begins with whey protein rather than the formation of a curd from milk. Therefore, the process may be carried out in a much shorter time frame. Other prior art patents also focus on the use of other non-casein proteins, such as soy or other vegetable protein, for making cheese-like products.

An additional benefit of incorporating significant amounts of whey proteins into food products is that they have high nutritive value for humans. In fact, the amino acid composition of whey proteins is close to an ideal composition profile for human nutrition. Whey proteins are also understood to have superior emulsifying capabilities in comparison with casein. Without wishing to be bound by theory, the incorporation of whey protein is expected to reduce defects such as phase separation during processing. In addition, such whey proteins provide a low cost dairy product which, if successfully incorporated into cheese products, would significantly increase the overall efficiency and effectiveness of the cheese making process.

Conventional experience has indicated that reducing the level of casein in cream cheese formulations makes it much more difficult to achieve and maintain a desirable finished texture of the food product, such as in terms of firmness, smoothness, spreadability, etc. Therefore, it would be desirable to provide a continuous process for making cream cheese products, particularly high moisture low fat content cream cheese products using low casein or casein-free cream cheese formulations and mixes, that still achieves and maintains acceptable texture and other sensory attributes.

Under the current Standards of Identity, cream cheese is required to contain at least 33 percent fat and no more than 55 percent moisture. Lower fat cream cheeses usually contain correspondingly higher proportions of moisture due to the decreased fat content. For instance, USDA specifications for light and reduced fat cream cheese allow for up to 70 percent moisture. However, increased moisture levels in the cream cheese will often result in a cream cheese product that is too soft and does not have the desired firmness of normal, higher fat cream cheese. Therefore, gums traditionally have been added to low fat cream cheese in order to impart a firmer texture. Unfortunately, the addition of gums and the like also results in a more gel-like texture that is less desirable than the smooth, creamy texture of normal cream cheese, and does not spread as well as normal cream cheese. Therefore, there remains a need for a low fat, high moisture cream cheese or cream cheese-like product that has a firm and spreadable texture similar to normal cream cheese and has increased yield stress and decreased deformation (decreased gel-like texture) when compared to conventional low fat, high moisture cream cheese. There also remains a need for a low fat, high moisture, low casein cream cheese or cream cheese like product that has a firm and spreadable texture similar to normal cream cheese and has increased yield stress and decreased deformation when compared to conventional low fat, high moisture, low casein cream cheese. It is also desirable to provide a continuous process using non-casein protein (i.e., alternative protein) to make a cheese-like product with texture and firmness like that of normal cream cheese. It is also desirable to provide a low-fat cream cheese with lower casein content and higher whey protein content that has texture and spread attributes similar or identical to traditional, higher fat cream cheese. The present invention provides such a high moisture cream cheese having the desired texture and spread attributes, as well as other advantages further described herein.

A number of prior art patents have attempted to create low fat cheeses with substantial amounts of whey protein. For instance, U.S. Pat. No. 5,356,639 to Jameson discloses a process for the production of a fermented concentrate from various milk products (e.g., whole milk, skim milk, or milk with added milk components). The process includes the steps of (1) selectively concentrating milk; (2) increasing the ionic strength of the concentrate to maintain the milk in the liquid phase and therefore prevent formation of a coagulum both during and after fermentation; (3) fermenting the concentrate with lactic acid producing bacteria; and (4) removing water from the fermented liquid concentrate. The final product includes substantially all of the whey proteins originally present in the milk. However, Jameson still has a casein-to-whey ratio of approximately 80:20, and requires a greater length of time to obtain a finished cheese-like product due to the necessity of a fermentation step.

Guinee et al. (Int. Dairy Journal 5:543-568 (1995)) reviewed the general state of the art relating to incorporation of whey protein into cheese or cheese products. High-heat treatment of milk impairs rennet coagulation, curd syneresis, curd structure and texture, as well as functional properties such as meltability and stretchability of the resulting cheese. The heat treatment of milk, after being curded to form semi-hard cheeses, does allow production of cheeses having higher whey protein levels. Unfortunately, such cheeses also exhibit poorer curd fusion and lower yield stress (fracture) values during ripening. Such cheeses also have higher moisture content, often resulting in a gel-like texture and, without the benefit of the present invention such cheeses do not have the desirable texture of normal cream cheese.

U.S. Pat. No. 6,558,716 to Kent describes methods for increasing the whey protein of cheese by providing a "functionally enhanced" whey protein. The method requires combining a cheese curd and whey protein composition to form a whey protein-cheese curd blend, and then subjecting the whey protein-cheese curd blend to high shear and an elevated temperature for a time sufficient to provide a stable cheese product supplemented with whey protein. The heat treatment effectively transforms the whey protein to produce a "functionally enhanced" whey protein which allows for the formation of a stable cheese product containing the functionally enhanced whey protein. Preferably, the blend is homogenized at a pressure of about 1,000 to about 8,000 psi and treated at a temperature from about 175 to about 215 degrees Fahrenheit. Kent discloses a method of incorporating whey protein in cheese products, but does not teach a method for replacing casein outright with whey protein. Kent also requires a fermentation step to produce a stable cheese having significant levels of whey protein.

U.S. Pat. No. 6,419,975 and U.S. Pat. No. 6,406,736 to Han describe methods of creating a casein-free cheese. According to the process of the invention, non-casein protein is mixed with hot water and melted fat to form an emulsion. The emulsion is then subjected to a homogenization step and a heating step. The pH of the resulting compound is then adjusted to about 4 to about 6, and then subjected to a second homogenization step to form a cream cheese product.

U.S. Pat. No. 6,303,160 to Laye attempts to solve the problems with texture in the prior art by providing a high moisture cream cheese with increased firmness by maintaining moisture levels during the manufacturing process at levels below the final target moisture level of the final cream cheese product; the moisture level of the final composition is then adjusted to the final target moisture level by the addition of water. Manipulating the moisture content of cream cheese in this manner has been shown to result in increased levels of firmness in the final cream cheese product. This process, however, requires a fermentation step, and therefore a lengthy production time.

Canadian Pat. No. 2,442,387 to Wolfschoon describes a method of incorporating whey proteins into foodstuffs to provide a casein-to-protein ratio of up to 20:80 by acidifying an aqueous solution of one or more whey proteins, blending with a fat to create an acidified whey protein fatty emulsion, and blending the emulsion with a foodstuff. A cream cheese product with the desired yield stress and deformation of the present invention is not described.

U.S. Pub. No. US 2004/0219273 A1 to Cha discloses the use of acid whey (pH 3.5-5.5, preferably 4.6-5.2) to make cream cheese-like products. Gums may be added to increase the yield stress of such compounds. However, Cha does not disclose starting with a whey compound with sufficient acidity to obtain the desired firmness and texture of the present invention. Cha also fails to disclose a low fat cream cheese-like product with moisture levels as high as in the present invention while still maintaining the desired firmness and texture. The steps and conditions of the present invention are specifically designed to use highly acidic pH treatments, heat treatments, and homogenization to significantly increase the yield stress and decrease deformation of high moisture low fat cream cheese products beyond what is disclosed in prior art processes.

U.S. Patent No. 6,261,624 to Hudson describes hydrolyzing a whey protein preparation in acid and heating to form a weak gel that is dried and ground into powder that may be used as a thickening agent in foodstuffs. Hudson does not describe manufacture of a high moisture low fat cream cheese with enhanced firmness and texture properties

SUMMARY

The present invention provides for improved firmness and spreadability in high moisture, low fat cream cheese products with low casein-to-whey-protein ratios. Cream cheese-like products made with high amounts of whey protein ordinarily have a more gel-like texture that is less desirable and does not spread as well as ordinary cream cheese. The present invention increases the firmness of such products, imparting texture characteristics similar or superior to conventional casein-containing cream cheese. According to the present invention, in one embodiment a whey protein source in aqueous medium is treated with one or more acids to lower its pH to below about 4.0, and particularly below 3.5, and then is heated sufficiently to form an acidified whey protein aggregate, which in turn is blended with a fat source, and a resulting blend is pH adjusted to a pH of about 4.5 to about 5.1 to provide a cream cheese mix. Alternatively, this pH adjustment can be performed before blending with the fat source. The cream cheese mix is homogenized to provide a dairy emulsion in the form of a low casein content cream cheese having a firm, smooth, and spreadable texture and a mild dairy flavor. Alternatively, the step of adjusting the pH to about 4.5 to about 5.1 may be performed after homogenization. Natural dairy flavors optionally can be included in the cream cheese product.

The cream cheese product manufactured by processing according to an embodiments of this invention contains least about 69 weight percent moisture, less than about 10 weight percent fat, and has a casein-to-whey ratio of about 40:60 to about 0:100, respectively, and has a yield stress of at least about 1200 Pa and a deformation value of less than 0.4. The cream cheese manufacturing processing according to embodiments of this invention can be completed within 24 hours, without the need for a time-consuming fermentation step(s), to produce a cheese-like product that texturizes whey protein to mimic characteristics of casein protein in a cream cheese system. In fact, in a continuous system, a low fat, high moisture cream cheese product may be obtained in as little as 45 minutes. The resulting high moisture and low fat and casein content cream cheese product has textural attributes comparable to, or even better than, common commercial cream cheeses. Savings in material costs can be achieved as casein and fat level requirements are reduced, while moisture content level can be increased, without detriment to product quality.

In a more particular embodiment, there is a method for making a cream cheese product in which a whey protein source is treated with a food safe organic or mineral acid to reduce pH to below about 4.0, and preferably below about 3.5, treated with a first heating step, blended with cream to form a cream cheese mix, adjusted to a higher pH (preferably from about 4.5 to about 5.1), treated with a first homogenization step, treated with a second heating step, optionally blended with salt and gum compounds, and treated with a third heating step followed by a second homogenization step. These steps may be modified without deviating from the present invention, as long as the whey protein source is initially adjusted to a pH of less than about 4.0, and particularly below about 3.5, and then heated to a time and temperature sufficient to denature the whey proteins (for example about 180° F. for at least about 6 min.). The resulting finished cream cheese product is characterized by increased yield stress (firmness) and decreased deformation (a creamier and more spreadable consistency) as compared to other cream cheese products with the same moisture, fat, and whey protein content.

DETAILED DESCRIPTION

Figure 1:
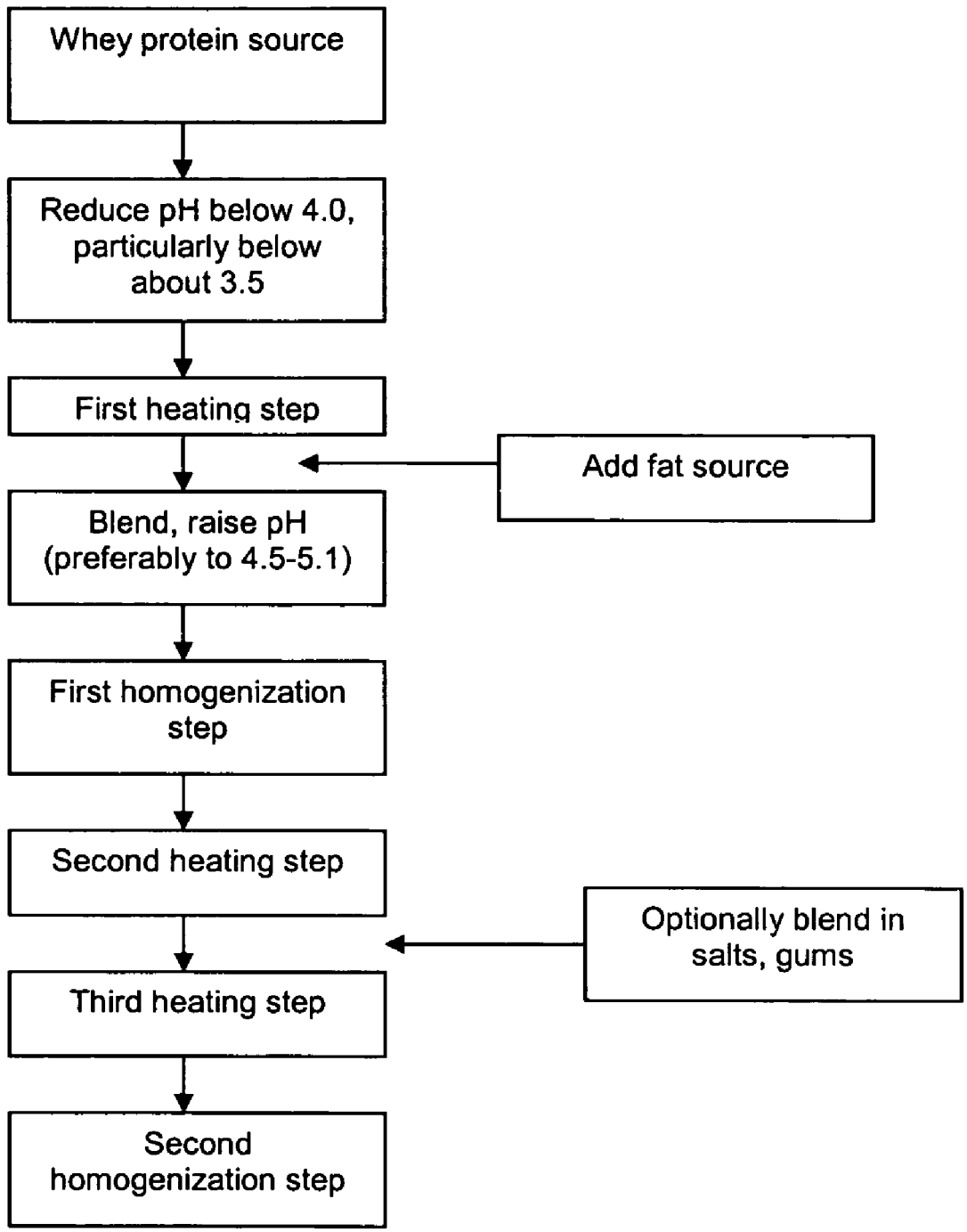
FIG. 1 provides a schematic flow diagram for one example of a method of making a high moisture, low casein and low fat cream cheese product in accordance with an embodiment of the present invention.

The present invention provides for the manufacture of high moisture low fat cream cheese products with a texture and spreadability similar to cream cheeses with higher fat and lower moisture content. The desired texture may be achieved in cream cheese-like spreads with even higher moisture content than those presently commercially available. Without limitation, the present invention includes, but is not limited to, improving the texture and spreadability of low casein or casein-free cream cheese products made with substantial levels of non-casein proteins and with higher than normal moisture content, such as greater than about 69 percent and particularly 73-75 percent moisture by weight, and low fat, such as less than about 10 percent and particularly 7-9 percent fat by weight. The present invention surprisingly texturizes whey protein to mimic characteristics of casein protein in a cream cheese product, producing a high moisture, low fat, low casein cheese system that despite its high moisture and low fat composition has the same texture attributes as common commercial light soft cream cheese with lower moisture, higher fat, and higher casein content (e.g., a light cream cheese with a casein-to-whey ratio of approximately 85:15, moisture content of about 55-70%, and fat content of about 16.5%).

Whereas cream cheese products with substantial amounts of non-casein protein, such as whey protein or whey protein concentrate, often do not have the same texture as cream cheeses made with casein, the present invention allows for producing cream cheese-like products with substantial amounts of whey protein that have yield stress and deformation values much closer to those of normal cream cheese than have been otherwise achieved in cream cheese products with substantial amounts of non-casein proteins. Although it has been suggested that cream cheese products incorporating significant levels of whey protein can be given increased firmness by increased heating, most of these products are already processed at relatively high temperatures so that additional heating may coagulate the product or impart off flavors. The present invention, on the other hand, yields a cream cheese product with a desirable firmness akin to that of normal cream cheese that is smooth and highly spreadable, and lacks the gel-like texture of other cream cheese-like products made with substantial amounts of non-casein proteins. Quantitative and qualitative measurements both indicate firmer, smoother, and more spreadable texture is achieved according to the present invention.

The present invention is especially suitable for producing cream cheeses with a low casein-to-whey ratio, generally from about 40:60 to about 0:100, respectively, and particularly from about 15:85 to about 0:100, respectively. In one embodiment of the present invention, a low fat, high moisture cream cheese is produced from water, a whey protein source (for example, whey protein concentrate, whey protein isolate, sweet whey, acid whey, or combinations thereof) and a source of fat (for example, cream, butter, anhydrous milk fat, vegetable fat, or combinations thereof). The whey protein source can be supplied in dry or liquid form. The whey protein source preferably is comprised of at least about 30-85% whey protein, particularly about 50-80%, on a dry basis. The whey protein source is treated with one or more food grade organic or mineral acids. The food grade acid is an edible acid selected from the group consisting of citric acid, acetic acid, lactic acid, malic acid, fumaric acid, tartaric acid, hydrochloric acid, sulfuric acid, and phosphoric acid, or a combination thereof. This acidification treatment of the whey protein generally is conducted in an aqueous medium. The relative amounts of whey, acid, and water are controlled to bring about the desired downward adjustment of the pH of the aqueous mixture to less than about 4.0, particularly less than about 3.5. The pH of the whey protein source is lowered to a level at or below about 4.0. It is an important aspect of the present invention to lower the pH to about 4.0 or below, since when the pH of the whey protein source is significantly higher than about 4.0, the final product has been shown to lack the desired firm texture and spreadability. The acidified whey protein is then heated at conditions effective to denature the whey proteins and form an acidified whey protein aggregate such as, for example, a temperature of at least about 180° F. for a time of at least about 6 minutes.

Without wishing to be bound by a particular theory, it appears that the acidification and heat treatment serve to denature the whey proteins to form an aggregate that plays a role in increasing the yield stress and decreasing the deformability of the final product. Lowering the pH and applying heat treatment appears to unwind the whey protein chains, creating fine strands that tend to form aggregates that have a high potential for binding free water within the cream cheese system. The tertiary structure of the whey proteins is thus modified in order to allow for increased chemical interaction between individual protein strands, in turn altering the quaternary structure of the proteins and forming a matrix that can accommodate higher levels of moisture, leading to increased viscosity and yield stress of the final product. This acid and heat treatment does not significantly hydrolyze whey proteins, but rather effects denaturing of the proteins and alters their tertiary and quaternary structures. Gel electrophoresis has shown that the acid and heat treatments of the present invention leave the whey proteins essentially intact.

The acidified whey protein aggregate is then further processed to form a low casein cream cheese-like product. A number of processes may be used to form a spreadable cream cheese product from the acidified whey protein aggregate. For example, without meaning to limit the scope of the present invention, the process described as follows may be used to create a finished cream cheese product according to the present invention. In one embodiment, a fat source, such as anhydrous milk fat, concentrated milk fat (cream), butter, or another dairy fat may be added to the acidified whey protein aggregate after the initial heat treatment. Optionally, an edible vegetable oil may be used as the fat source instead of a dairy fat. Suitable vegetable oils in this respect include, for example, palm oil, palm kernel oil, canola oil, hydrogenated soybean oil, and the like, as well as mixtures thereof. The fat may be added directly to the acidified whey protein aggregate blending the fat and whey protein aggregate to form a protein-fat mixture, or cream cheese mix. Alternatively, the acidified whey protein aggregate may be stored under refrigeration for one week or more prior to blending with cream to form a cream cheese mix. A second pH adjustment step may then be performed, in which the pH of the cream cheese mix is adjusted to a "normal" range desirable in the finished product, preferably about 4.5 to about 5.1. Alternatively, the second pH adjustment step may be performed prior to the addition of cream to form a cream cheese mix, or after the steps that follow. Optionally, other protein sources, including without limitation dry whey powder, whey protein concentrate, milk protein concentrate, fresh milk, and non-fat dry milk can be added along with the fat source.

This second pH adjustment is performed in order to ensure that the finished product does not have an acidic or sour flavor. Without this alkaline pH adjustment, the finished product would still have a desirable texture, with increased firmness and spreadability, but may have undesirable off flavors. However, it is contemplated that one of skill in the art may manipulate this pH adjustment in order to impart particular flavors on the finished product.

The pH adjusted cream cheese mix or protein-fat mixture may then be homogenized in a first homogenization step. Preferably, this first homogenization step may carried out at 3000/500 to 5000/500 psi at or near the melting point of the fat source (for instance, at about 100° F.). This example refers to a two-stage homogenization treatment with 3000-5000 psi applied in the first stage and 500 psi in the second stage. Alternatively, a one-stage homogenization step may be used. The mixture may then be subjected to a second heating step, preferably at 180 to 200° F. for 5-30 minutes. The mixture may then be blended with emulsifying and/or stabilizing salts, gums, and other common additives, and subjected to a third heating step, preferably at 170 to 185° F. for 5 to 30 minutes. Finally, the mixture may be homogenized again in a second homogenization step, preferably at 1000/500 to 5000/500 psi. Once again, a one-stage homogenization step may alternatively be used.

The resultant cream cheese product may be packaged by any number of methods, including hot fill processes. Once cooled, the cream cheese has a firm, smooth, and spreadable texture, with a pleasant, mild dairy flavor. Natural dairy flavors or other flavors may optionally be added within the scope of the present invention. Optionally, other additives such as calcium, vitamins, or other additives may be added, preferably before homogenization, without departing from the spirit or scope of the invention. A number of unique manners of adding flavors to cream cheeses are known to those skilled in the art, and may easily be incorporated into the present invention.

FIG. 1 is a flow chart showing a method for making a high moisture and low casein and fat cream cheese in accordance with an embodiment of the present invention. Steps in the process may be modified without deviating from the invention as long as the initial pH adjustment reduces the pH to below about 4.0, preferably below about 3.5, and the first heating step is carried out at a temperature and time effective to denature the whey protein, The cream cheese products of the present invention have surprisingly firm texture and spreadability for products with such low amounts of casein, high amounts of moisture, and low amounts of fat. The texture attributes of the products made according to the present invention may be described in terms of yield stress and deformation. Qualitative measurements may also be taken, using standard sensory (organoleptic) testing. Sensory tests have been shown to have a high correlation with quantitative data, both showing that the present invention results in firmer textures and better spreadability than otherwise possible in low casein, low fat, high moisture cream cheese products.

For purposes herein, yield stress of a material is defined as the shear stress that must be overcome to initiate significant flow, and is related to the strength of a network of molecules. At any point below a given material's yield stress, the material will behave elastically, whereas stresses higher than the yield stress cause irrecoverable strain and result in "fracture." A number of methods may be used to measure yield stress. One such method that has gained wide acceptance is the "vane method," in which a predetermined number of vanes (relatively thin, flat, rigid blades mounted radially about an axis) are lowered into a sample and turned until the sample reaches fracture. The vane method was used to test samples made according to the present inventive process. Vane blades had a diameter of 1.613 cm and a height of 0.611 cm, and were turned at a rate of 0.1 rpm. Maximum torque and time at fracture were measured in order to calculate yield stress. All measurements were taken with a Haake viscometer (Thermo Haake, Paramus, N.J.) attached to the vane blades. Yield stress is calculated according to the following equation:

$$\text{Yield stress (Pa)} = [2 \times M_f \times (H/D + 1/6)^{-1}]/(\pi D^3)$$

wherein "D" represents vane blade diameter (in this case 1.613 cm), "H" represents vane blade height (in this case 0.611 cm), and "$M_f$" represents maximum torque achieved at fracture.

Figure 2:
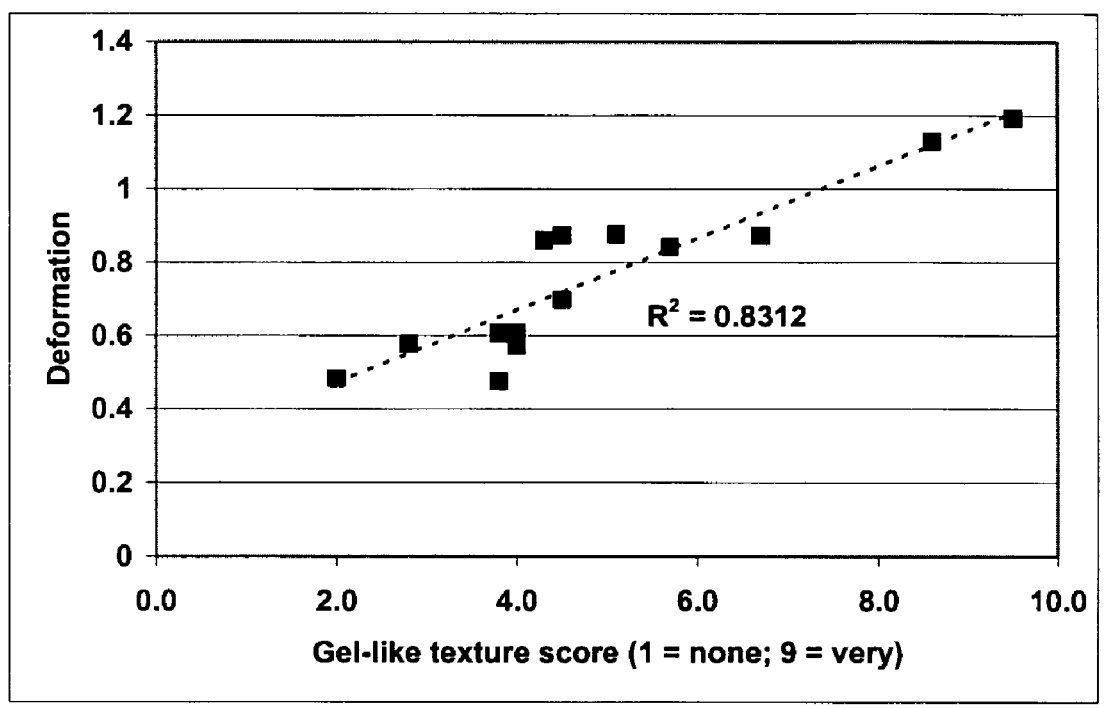
FIG. 2 is a plot showing a correlation between measured deformation value and sensory evaluation of gel-like textures of cream cheese products.

Deformation was also calculated using the vane method. For purposes herein, deformation is a measure of how far the vane blade may be rotated (in radians) before fracture occurs, and is a reliable indicator of spreadability, with low deformation values representing a smoother, more spreadable, and less gel-like texture, all of which are desirable attributes for cream cheese. Deformation may be calculated according to the following equation:

$$\text{Deformation} = T_f \times \text{angular velocity}$$
$$= T_f \times (2 \times \text{rpm} \times \pi)/60$$

wherein "$T_f$" represents time at fracture and "rpm" represents the rate at which the vane blades are turned (in this case, 0.1). FIG. 2 shows that there is a strong correlation between deformation values and qualitative sensory testing. Experienced cream cheese evaluators evaluated 14 cream cheese samples and evaluated texture on a scale of 1 (not at all gel-like) to 9 (very gel-like). As deformation values increased, sensory scores also increased. High deformation values indicate that the product is stickier, and does not spread as smoothly as products with lower deformation values.

The following examples describe and illustrate certain processes and products of the present invention. These examples are intended to be merely illustrative of the present invention, and not limiting thereof in either scope or spirit. Those skilled in the art will readily understand that variations of the materials, conditions, and processes described in these examples can be used. Unless otherwise noted, all percentages are by weight.

EXAMPLE 1

Preparation of Cream Cheese Incorporating Whey Proteins. A cream cheese product was prepared following the general flow diagram presented in FIG. 1. An inventive sample 1 representing the present invention was prepared particularly as follows: 67.04 lbs. of whey protein concentrate (WCP50, First District Association, Litchfield, Minn.) was blended with 7.36 lbs. dry whey and 325.6 lbs. water. The whey mix was acidified to pH 3.35 with 5 N hydrochloric acid, heated to 200° F., and held for 6 minutes. After heating, 57.02 lbs. whey mix was blended with 19.39 lbs. cream and pH adjusted to 4.9 to yield a cream cheese mix. The mix was heated to 140° F. and homogenized at 5000/500 psi (2 stage treatment). Next, 47.76 lbs. of the homogenized mix was heated to 200° F. and held at 200° F. for 10 min. The following ingredients were then added: 0.025 lbs. sorbic acid, 0.035 lbs. xanthan gum, 0.190 lbs. carob gum, 1.049 lbs. maltodextrin, 0.450 lbs. tricalcium phosphate, and 0.491 lbs. salt. Cheese moisture was adjusted to 73% by addition of small amount of water. The mix was then held at about 180° F. for 10 min. The final cream cheese mix was homogenized at 5000/500 psi, and packaged. The final cheese product was firm, smooth, and spreadable.

For purposes of comparison, a control sample, designated here as control sample 1, was created according to the following process: 9.55 lbs. of whey protein (WCP50) was blended with 1.05 lbs. dry whey, 16.41 lbs. water, and 19.39 lbs. cream. The mix was adjusted to pH 4.9 with lactic acid, homogenized at 5000/500 psi, heated to 200° F., and held 10 min. Salts and gums were added as described above (0.025 lbs. sorbic acid, 0.035 lbs. xanthan gum, 0.190 lbs. carob gum, 1.049 lbs. maltodextrin, 0.450 lbs. tricalcium phosphate, and 0.491 lbs. salt). Cheese mix moisture was adjusted to 73% and held at about 180° F. for 10 minutes, homogenized at 5000/500 psi, and packaged. The texture of the final cheese product was very soft, gummy, and gel-like.

After one month of storage, Yield Stress and Deformation were measured for the inventive and control samples, and the results are indicated in Table 1.

TABLE 1

|  | Inventive sample 1 | Control Sample 1 |
| --- | --- | --- |
| Yield stress (Pa) | 2051 | 526 |
| Deformation | 0.238 | 0.555 |

The inventive sample 1 had nearly a four-fold increase in yield stress compared to the control product made according to a prior art wheyless cream cheese process. Sensory testing by a blind panel of experienced cream cheese evaluators identified the inventive sample as "more cohesive" and "more mass cohesive" through quantitative descriptive analysis of the samples.

EXAMPLE 2

A process similar to Example 1, using phosphoric acid rather than hydrochloric acid for the initial pH adjustment, was used to make a cream cheese product, designated here as inventive sample 2, in the following manner, that was compared to a control product, designated here as control sample 2, which was prepared similarly to control sample 1 of Example 1. In preparing inventive sample 2, 67.04 lbs. of whey protein concentrate (WCP50) was blended with 7.36 lbs. dry whey and 325.6 lbs. water. The whey mix was acidified to pH 3.35 with 18% concentration phosphoric acid, heated to 200° F., and held for 6 min. After heating, 57.02 lbs. whey mix was blended with 19.39 lbs. cream and pH adjusted to 4.9 to yield a cream cheese mix. The mix was heated to 140° F. and homogenized at 5000/500 psi. Next, 47.76 lbs. of the homogenized mix was heated to 200° F. and held at 200° F. for 10 min. The following ingredients were then added: 0.025 lbs. sorbic acid, 0.035 lbs. xanthan gum, 0.190 lbs. carob gum, 1.049 lbs. maltodextrin, 0.450 lbs. tricalcium phosphate, and 0.491 lbs. salt. Cheese moisture was adjusted to 73% by addition of small amount of water. The mix was held at about 180° F. for 10 min. The final cream cheese mix was homogenized at 5000/500 psi and packaged. The final cheese product was firm, smooth, and spreadable.

The control sample 2 was prepared according to the same process as used for control sample 1 in Example 1. The texture of the final cheese product, i.e., control sample 2, was very soft, gummy, and gel-like.

Yield stress and deformation values were measured for inventive sample 2 and control sample 2, and the results are shown in Table 2. Inventive sample 2 was clearly superior in these measures of textural firmness.

TABLE 2

|  | Inventive Sample 2 | Control Sample 2 |
| --- | --- | --- |
| Yield stress (Pa) | 1795 | 526 |
| Deformation | 0.347 | 0.555 |

A blind panel of experienced cream cheese evaluators performed a quantitative descriptive analysis on both samples for sensory criteria, and judged the inventive sample 2 to require more force to spread, be of "firmer" consistency, "more cohesive'" "more dense," "more adhesive," "more mass cohesive," and "less astringent," as compared to control sample 2

EXAMPLE 3

Additional cream cheeses prepared in the following manners were studied. Both inventive and control cheeses prepared for this example had WPC 80 (Leprino Cheese) as the main protein source and all had 73% moisture, 9% fat, and 7% protein.

A cream cheese product representing the present invention, designated inventive sample 3, was made as follows. 41.12 lbs. WPC80 was blended with 35.28 lbs. dry whey, and 323.60 lbs. water. The whey mix was acidified to pH 3.35 with 5 N hydrochloric acid, heated to 200° F., and held for 6 min. After heating, the 57.25 lbs. whey mix was blended with 19.27 lbs. cream and pH adjusted to 4.9 to yield a cream cheese mix. The mix was then processed into cream cheese in the same manner as described for the inventive sample 1 in example 1. After refrigerated storage, the final cheese was firm, smooth, and spreadable.

The control sample, designated here as control sample 3, was made according to the following process: 5.89 lbs. WPC80 was blended with 5.05 lbs. dry whey, 46.32 lbs. water, and 19.47 lbs. cream. The mix was then processed into cream cheese in the same manner as described for the control samples in Examples 1 and 2. After refrigerated storage, final cheese texture was soft, gummy, and gel-like compared to the inventive sample. Yield stress and deformation were measured for both inventive sample 3 and control sample 3, and the results are indicated in Table 3.

TABLE 3

|  | Inventive Sample 3 | Control Sample 3 |
| --- | --- | --- |
| Yield stress (Pa) | 1880 | 387 |
| Deformation | 0.278 | 0.762 |

A blind panel of experienced cream cheese evaluators evaluated both samples for sensory criteria using quantitative descriptive analysis, and judged the inventive sample 3 to require more force to spread, be of "firmer" consistency, "more cohesive," "more dense," "more adhesive," "more mass cohesive," and "less astringent," than control sample 3.

EXAMPLE 4

A cream cheese product, designated here as inventive sample 4, was made according to the inventive sample process as described in Example 3, except that 18% concentration phosphoric acid rather than hydrochloric acid was used to adjust pH to 3.35. After refrigerated storage, the final cheese was firm, smooth, and spreadable. Comparison was made to a cream cheese product, designated here as control sample 4, which was made according to the control sample process as described in Example 3. The results are indicated in Table 4.

TABLE 4

|  | Inventive Sample 4 | Control Sample 4 |
| --- | --- | --- |
| Yield stress (Pa) | 1924 | 387 |
| Deformation | 0.216 | 0.762 |

A blind panel of experienced cream cheese evaluators evaluated both samples for sensory criteria using quantitative descriptive analysis, and judged the inventive sample 4 to require more force to spread, be of "firmer" consistency, "more cohesive," "more adhesive," "more mass cohesive," and "less astringent," and noticed less "vegetable notes" and less "brown/toasted notes," than control sample 4.

EXAMPLE 5

Two cream cheeses (one inventive and one control) had WPC 50 (First District Association) as the main protein source and all had 75% moisture, 7% fat, and 7% protein. The inventive sample, designated here as inventive sample 5, was made according to the following process: 59.5 lbs WPC50 was blended with 10.40 lbs dry whey, 330.10 lbs. water. The whey mix was acidified to pH 3.35 with 18% concentration phosphoric acid, heated to 200° F., and held for 6 min. After heating, 62.28 lbs. whey mix was blended with 11.11 lbs. cream and pH adjusted to 4.9 to yield a cream cheese mix. The mix was then processed into cream cheese in the same manner as described for the inventive sample 1 in example 1. After the salt and gum addition, 2.0 lbs. of natural flavor was added to 48.0 lbs of the cream cheese mix before the final homogenization step. Final cream cheese was firm, smooth, and spreadable.

The inventive sample was compared to a control sample, designated here as control sample 5, which was made according to the following process: 9.78 lbs WPC50 was blended with 1.46 lbs. dry whey, 53.01 lbs. water, and 12.35 lbs. cream. The mix was then processed into cream cheese as described for the control samples in Examples 1 and 2 above, except that that the final cheese had 75% moisture and 7% fat. After refrigerated storage, final cheese texture was very soft, gummy, and gel-like. After one month refrigerated storage, yield stress and deformation were measured, and the results are indicated in Table 5.

TABLE 5

|  | Inventive Sample 5 | Control Sample 5 |
| --- | --- | --- |
| Yield stress (Pa) | 1210 | 275 |
| Deformation | 0.217 | 0.889 |

A panel of experienced cream cheese evaluators evaluated both samples for sensory criteria using quantitative descriptive analysis,. The panel found that the inventive sample 5 required "more force to spread," and was "firmer," "more cohesive," "more dense," "more adhesive," and "more mass cohesive," than the control sample 5.

What is claimed is:

1. A method for producing a low fat, high moisture cream cheese product comprising:
  (a) reducing the pH of a whey protein source to less than about 4.0 to provide an acidified whey protein;
  (b) heating said acidified whey protein source in a first heating step to to form an acidified whey protein aggregate;

(c) blending said acidified whey protein aggregate with a fat source to provide a cream cheese blend;

(d) homogenizing the cream cheese blend in a first homogenization step; and (e) raising the pH at any time after step (b) to provide a cream cheese-like product having a pH of about 4.5 to about 5.1, a moisture content of at least about 69 percent, a fat content less than about 10 percent, and a casein content to whey content ratio of about 40:60 to about 0:100, respectively.

2. The method of claim 1, wherein the whey protein source is comprised of at least about 30% protein on a dry basis.

3. The method of claim 2, wherein the step of reducing the pH of the whey protein source to less than about 4.0 to provide an acidified whey protein comprises adding an edible acid selected from the group consisting of citric acid, acetic acid, lactic acid, malic acid, fumaric acid, tartaric acid, hydrochloric acid, sulfuric acid, and phosphoric acid, or a combination thereof.

4. The method of claim 1, wherein the whey protein source is selected from the group consisting of whey protein concentrate, whey protein isolate, sweet whey, acid whey, or a combination thereof; and the fat source is a dairy fat source selected from the group consisting of cream, butter, anhydrous milk fat, or a combination thereof.

5. The method of claim 1 wherein the fat source is a vegetable fat source selected from the group consisting of palm oil, palm kernel oil, canola oil, and hydrogenated soybean oil.

6. The method of claim 1, wherein the first heating step is carried out at a temperature of at least about 180° F. for a time of at least about 6 minutes and the first homogenization step is carried out using a two-stage homogenization step.

7. The method of claim 6, wherein the second heating step is carried out at about 180 to about 200° F. for about 5 to about 30 minutes.

8. The method of claim 1, further comprising blending stabilizing gum with the cream cheese-like product; heating in a third heating step carried out at about 170 to about 185° F. for about 5 to about 30 minutes; and homogenizing in a second homogenization step.

9. The method of claim 8 wherein the stabilizing gum is selected from the group consisting of xanthan gum, carob bean gum, guar gum, Tara gum, locust bean gum, and carrageenan.

10. The method of claim 9 wherein the acidified whey protein aggregate is stored under refrigeration for at least one week prior to said blending with said fat source to form said cream cheese blend.

11. A method for producing a spreadable food product containing at least about 70 weight percent moisture, less than about 10 weight percent fat and having a casein to whey ratio of about 40:60 to about 0:100, respectively, said method comprising:

(a) combining at least one food grade acid with a whey protein source in an aqueous medium comprising at least about 30 percent whey protein on a dry basis to form an acidified whey protein source with a pH of less than about 4.0;

(b) heating said acidified whey protein source in a first heating step at a temperature sufficient to denature said acidified whey protein to form an acidified whey protein aggregate;

(c) blending said acidified whey protein aggregate with a fat source to form a protein fat mixture;

(d) adjusting the pH of said protein-fat mixture to a level of about 4.7 or higher;

(e) homogenizing said protein-fat mixture in a first homogenization step;

(f) heating said protein-fat mixture in a second heating step at about 180 to about 200° F. for about 5 to 30 minutes;

(g) blending the protein-fat mixture with at least one gum;

(h) heating the protein-fat mixture in a third heating step at about 170 to about 185° F. for about 5 to 30;

(i) homogenizing the protein-fat mixture in a second homogenization step to form a spreadable food product, wherein the first and second homogenization steps are carried out using separate two-stage homogenization steps.

12. The method of claim 11, wherein the whey protein source is essentially free of casein.

13. The method of claim 12, wherein the whey protein source comprises whey protein concentrate or whey powder.

14. The method of claim 11, wherein the fat source is cream, butter, or anhydrous milk fat, 15. The method of claim 11, wherein the spreadable food product has a yield stress of at least about 1200 Pa.

16. The method claim 15 wherein the spreadable food product has a deformation of less than 0.4.

* * * * *